(12) United States Patent
Campbell et al.

(10) Patent No.: US 11,732,589 B1
(45) Date of Patent: Aug. 22, 2023

(54) AIRFOIL VANE MULTIPLET WITH INTERLEAVED FIBER PLIES

(71) Applicant: RAYTHEON TECHNOLOGIES CORPORATION, Farmington, CT (US)

(72) Inventors: Christian X. Campbell, West Harford, CT (US); Howard J. Liles, Newington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/865,949

(22) Filed: Jul. 15, 2022

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F01D 5/284* (2013.01); *F05D 2220/323* (2013.01); *F05D 2300/6033* (2013.01)

(58) Field of Classification Search
CPC .......... F01D 5/147; F01D 5/282; F01D 5/284; F05D 2220/323; F05D 2300/6033
See application file for complete search history.

(56) References Cited

U.S. PATENT DOCUMENTS

| 9,103,214 | B2 | 8/2015 | McCaffrey |
| 9,752,445 | B2 | 9/2017 | Watanabe |
| 11,035,239 | B2 | 6/2021 | de Diego et al. |
| 11,162,372 | B2 | 11/2021 | Whittle et al. |
| 2013/0251939 | A1* | 9/2013 | Kleinow ................ F01D 5/284 156/89.11 |

* cited by examiner

*Primary Examiner* — Jacob M Amick
(74) *Attorney, Agent, or Firm* — Carlson, Gaskey & Olds, P.C.

(57) ABSTRACT

An airfoil vane multiplet includes airfoil tubes that each have airfoil tube fiber plies. A plurality of the airfoil tube fiber plies extend along the airfoil tube and turn to project outwardly from the airfoil tube. Connector fiber plies include airfoil holes through which the airfoil tubes extend. The connector fiber plies are interleaved with the plurality of airfoil tube fiber plies such that the airfoil tubes are secured together.

13 Claims, 8 Drawing Sheets

AIRFOIL VANE MULTIPLET WITH INTERLEAVED FIBER PLIES

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil vane multiplet according to an example of the present disclosure includes airfoil tubes. Each airfoil tube has airfoil tube fiber plies. At least some of the airfoil tube fiber plies extend along the airfoil tube and turn to project outwardly from the airfoil tube. There are connector fiber plies that include airfoil holes through which the airfoil tubes extend. The connector fiber plies are interleaved with the plurality of airfoil tube fiber plies such that the airfoil tubes are secured together.

In a further embodiment of any of the foregoing embodiments, the plurality of the airfoil tube fiber plies have, relative to an interior of the airfoil tube, inner fiber plies and outer fiber plies, and a portion of the connector fiber plies are sandwiched between the inner fiber plies and the outer fiber plies.

In a further embodiment of any of the foregoing embodiments, the inner fiber plies are sandwiched between two of the connector fiber plies.

In a further embodiment of any of the foregoing embodiments, the outer fiber plies of one of the airfoil tubes abut the outer fiber plies of another of the airfoil tubes.

In a further embodiment of any of the foregoing embodiments, the plurality of the airfoil tube fiber plies includes interconnecting U-shaped fiber plies that bridge adjacent ones of the airfoil tubes and which are interleaved with the connector fiber plies.

In a further embodiment of any of the foregoing embodiments, each of the airfoil tubes includes a tube end portion that extends through one of the airfoil holes, and further includes collar fiber plies wrapped around the tube end portion. The collar fiber plies together with the airfoil tube fiber plies define a pocket, and edges of a portion of the airfoil tube fiber plies of another one of the airfoil tubes are received into the pocket.

In a further embodiment of any of the foregoing embodiments, the plurality of the airfoil tube fiber plies include, relative to an interior of the airfoil tube, inner fiber plies and outer fiber plies, one of the outer fiber plies has an upturned end, another of the outer fiber plies has a downturned end, the upturned end and the downturned end forming a foot that abuts an adjacent one of the airfoil tubes.

A gas turbine engine according to an example of the present disclosure includes a compressor section, a combustor in fluid communication with the compressor section, and a turbine section in fluid communication with the combustor. The turbine section has airfoil vane multiplets as recited in any of the foregoing embodiments.

A method of fabricating an airfoil vane multiplet according to an example of the present disclosure includes providing airfoil tubes that each include airfoil tube fiber plies, providing connector fiber plies that include airfoil holes, inserting the airfoil tubes through, respectively, the airfoil holes, and prior to the inserting and after the inserting, turning portions of the airfoil tube fiber plies outwardly to project from the airfoil tube such that the connector fiber plies are interleaved with the airfoil tube fiber plies to secure the airfoil tubes together.

In a further embodiment of any of the foregoing embodiments, prior to the inserting of the airfoil tubes, the airfoil tubes are adjoined such that the portions of the airfoil tube fiber plies that are turned outwardly abut each other.

In a further embodiment of any of the foregoing embodiments, after the inserting of the airfoil tubes, the portions of the airfoil tube fiber plies that are turned outwardly are folded onto one of the connector fiber plies, followed by applying additional one of the connector fiber plies on the portions of the airfoil tube fiber plies that are folded.

In a further embodiment of any of the foregoing embodiments, the airfoil tube fiber plies include interconnecting U-shaped fiber plies that bridge adjacent ones of the airfoil tubes and which are interleaved with the connector fiber plies.

In a further embodiment of any of the foregoing embodiments, each of the airfoil tubes includes a tube end portion, and further including collar fiber plies wrapped around the tube end portion. The collar fiber plies together with the airfoil tube fiber plies define a pocket, and edges of a portion of the airfoil tube fiber plies of another one of the airfoil tubes are received into the pocket.

In a further embodiment of any of the foregoing embodiments, the airfoil tube fiber plies include, relative to an interior of the airfoil tube, inner fiber plies and outer fiber plies, and including upturning one of the outer fiber plies to form an upturned end, and down-turning another of the outer fiber plies to form a downturned end. The upturned end and the downturned end forming a foot that abuts an adjacent one of the airfoil tubes.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
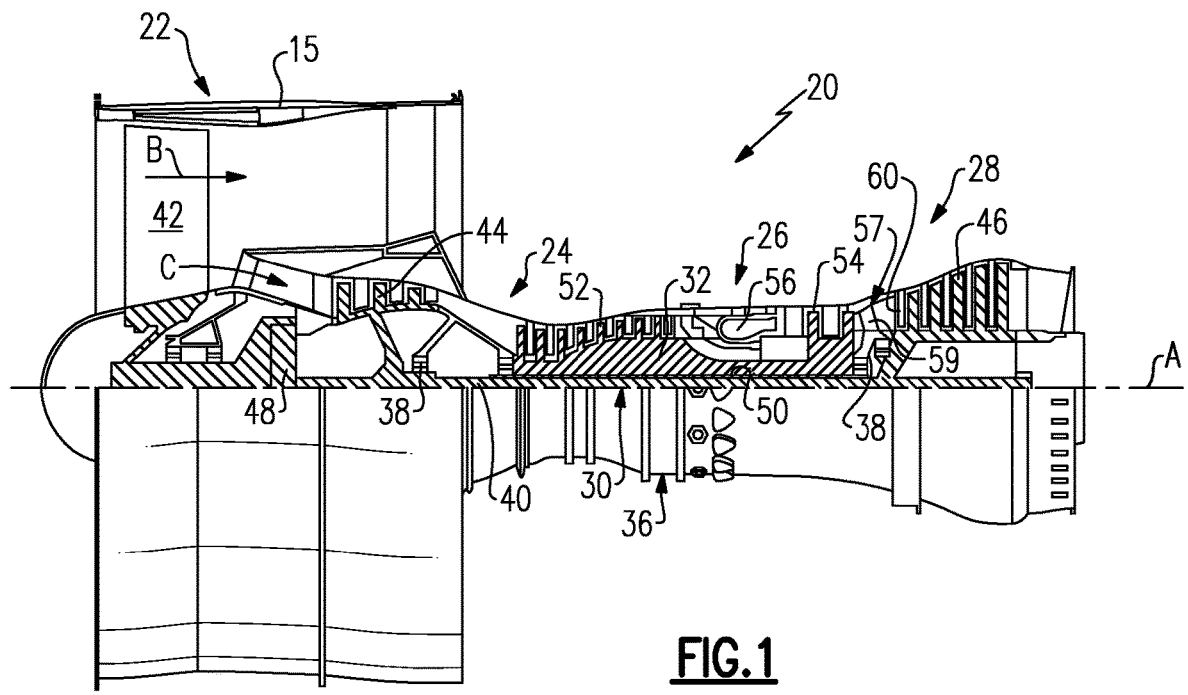
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram °R)/(518.7°R)]$^{0.5}$, The "Low corrected fan tip speed" as disclosed herein according to one non-limiting embodiment is less than about 1150.0 ft/second (350.5 meters/second), and can be greater than or equal to 1000.0 ft/second (304.8 meters/second).

Airfoil vanes in a turbine section of a gas turbine engine can be provided as vane multiplets or vane singlets. Vane multiplets have two or more airfoils affixed with a single common outer wall and a single common inner wall. An airfoil singlet has one airfoil adjoined with a single inner wall and a single outer wall. Airfoil singlets are typically easier to manufacture from ceramic matrix composite (CMC) materials, are easier to apply coatings on, and have lower thermal stresses. Vane singlets, however, are often mounted with internal spars and must bear relatively high aerodynamic loads that may be undesired for CMC materials. Moreover, core gas flow can leak through gaps at the mating interfaces between adjacent singlets, which debits engine efficiency. Vane multiplets have potential to lower aerodynamic stresses and to eliminate some of the mate face gaps. However, the relatively complex geometry of a vane multiplet is challenging to fabricate with CMCs.

Figure 2B:
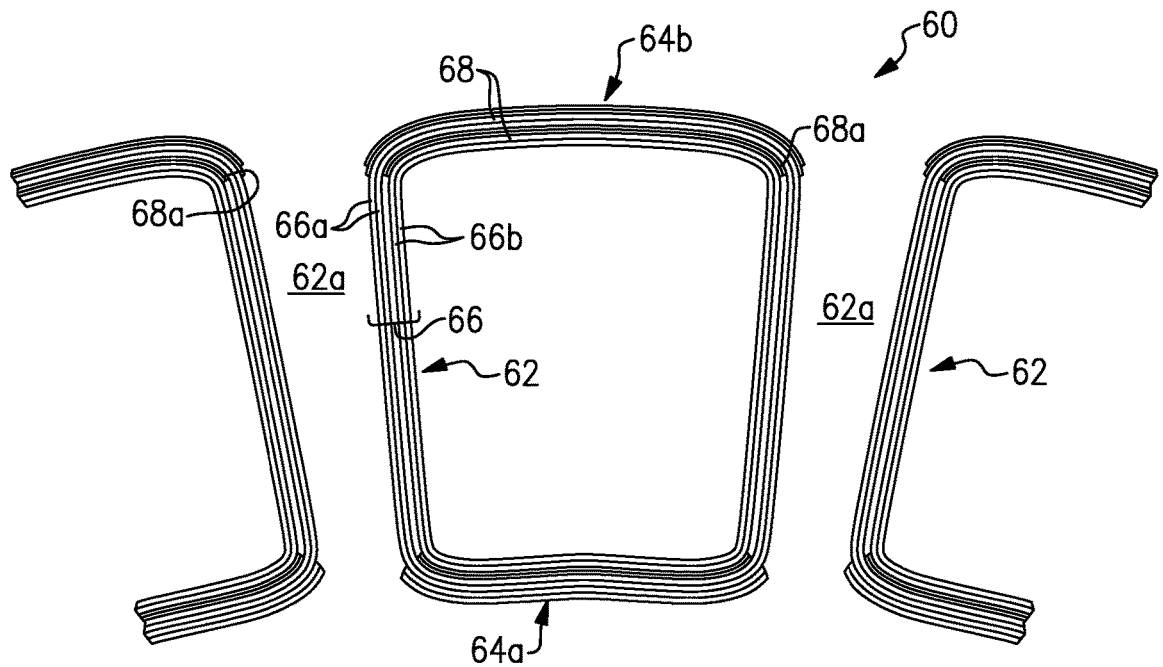
FIG. 2B illustrates a sectioned view of a portion of the airfoil vane multiplet of FIG. 2A.
Figure 2A:
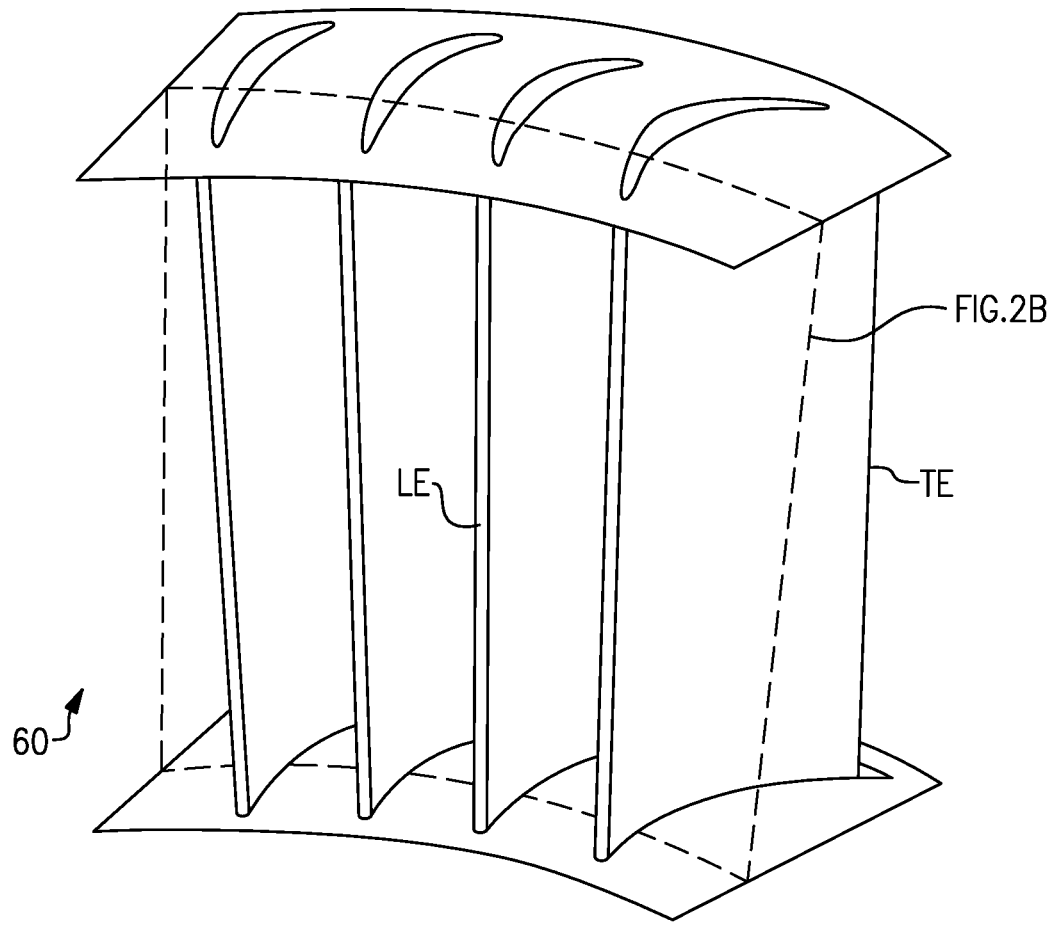
FIG. 2A illustrates an example of an airfoil vane multiplet.

With regard to these challenges, FIG. 2A illustrates an airfoil vane multiplet 60 (arc segment) from the turbine section 28 of the engine 20, and FIG. 2B illustrates a sectioned view (looking axially upstream) of a portion of the airfoil vane multiplet 60. The airfoil vane multiplet 60 includes airfoil tubes 62 that are adjoined with inner and outer walls 64a/64b. A plurality of the airfoil vane multiplets 60 are arranged together in a circumferential row in the engine 20 to form a vane ring.

The airfoil vane multiplet 60 is made of a CMC material. The CMC material is comprised of (ceramic) fiber plies in a ceramic matrix. Example ceramic matrices are silicon-containing ceramic, such as but not limited to, a silicon carbide (SiC) matrix or a silicon nitride (Si3N4) matrix. Example ceramic fibers of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

Each of the airfoil tubes 62 includes airfoil tube fiber plies 66. The airfoil tube fiber plies 66 include, relative to an interior 62a of the airfoil tube 62, inner fiber plies 66a and outer fiber plies 66b. The outer fiber plies 66b may form the aerodynamic airfoil shape, while the inner fiber plies may have an airfoil shape or other shape, such as but not limited to, a circular or oval shape. In this example, both the inner and outer fiber plies 66a/66b extend along the airfoil tube 62 and turn to project outwardly from the airfoil tube 62. The airfoil vane multiplet 60 further includes connector fiber plies 68 that have airfoil holes 68a through which the airfoil tubes 62 extend. The connector fiber plies 68 are interleaved with at least a portion of the airfoil tube fiber plies 66 such that the airfoil tubes 62 are secured together. The arrangement of the airfoil tube fiber plies 66 and further details of the arrangement will also become more apparent in the description of the fabrication of the airfoil vane multiplet 60 that follows.

Figure 3:
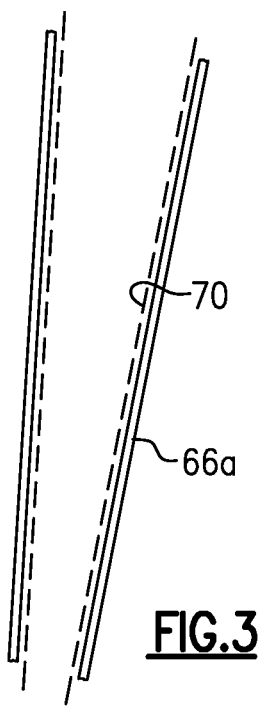
FIG. 3 illustrates inner fiber plies wrapped around a mandrel.

A method of fabricating the airfoil vane multiplet 60 generally includes laying-up the fiber plies to form a fiber preform and then densifying the fiber preform with the ceramic matrix. Referring to FIG. 3, a portion of the airfoil tube 62 is formed by first wrapping one or more of the inner fiber plies 66a around a mandrel 70. For example, the inner fiber plies 66a are formed by weaving or braiding fibers around the mandrel 70 to form the initial tube structure.

Figure 4:
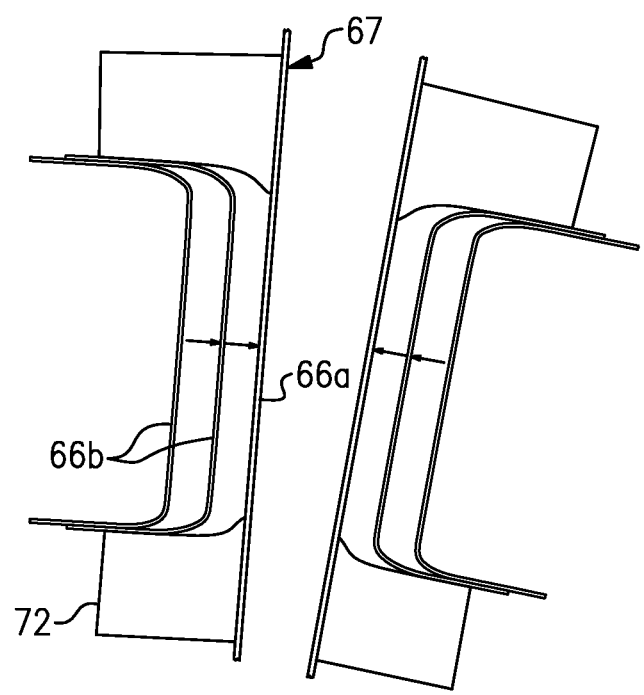
FIG. 4 illustrates outer fiber plies applied to the inner fiber plies in a tool.
Figure 5:
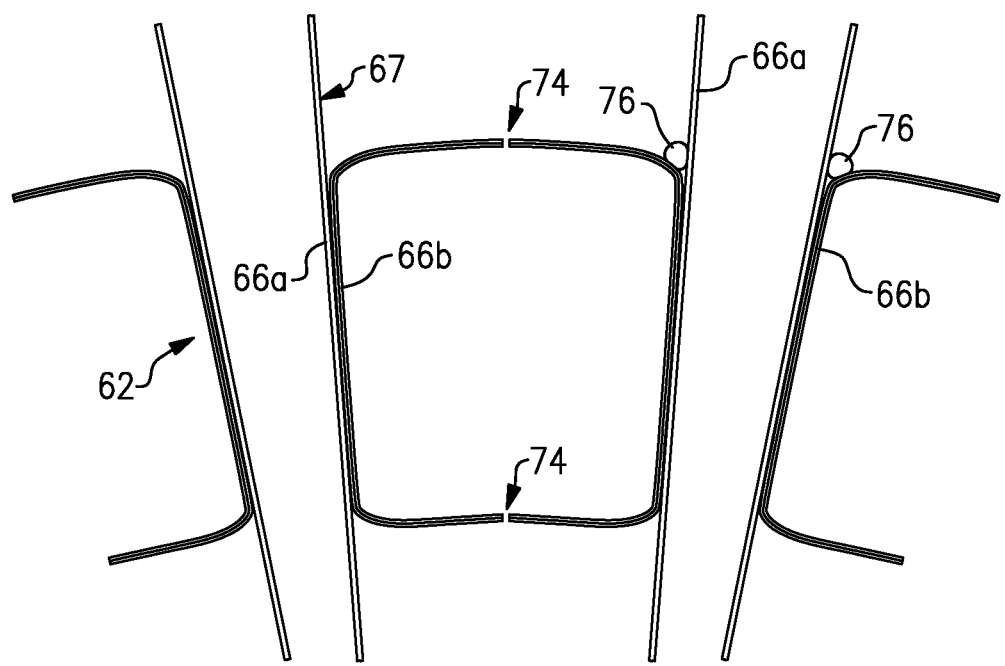
FIG. 5 illustrates a plurality of intermediate airfoil tubes abutting each other.

Next, as shown in FIG. 4, the preformed inner fiber plies 66a are held in a tool 72 and the outer fiber plies 66b are applied. A central section of the outer fiber plies 66b runs along the tube, while the end sections of the outer fiber plies 66b turn and project outwardly from the tube to run along the upper and lower sides of the tool 72. This leaves upstanding end portions of the inner fiber plies 66a as a collar 67. The laid-up inner and outer fiber plies 66a/66b form an intermediate airfoil tube. As shown in FIG. 5, two or more intermediate airfoil tubes are then brought together such that the edges of the outer airfoil fiber plies 66b abut in respective joints 74. The joints 74 may be butt joints or shiplap joints but are not limited thereto. The intermediate airfoil tubes may be fixed in place using a tool so that the tubes do not shift relative to one another during subsequent processing. Optionally, inserts 76 may be applied in corners between fiber plies to reduce void volume that may otherwise be present where the fiber plies turn.

Figure 6A:
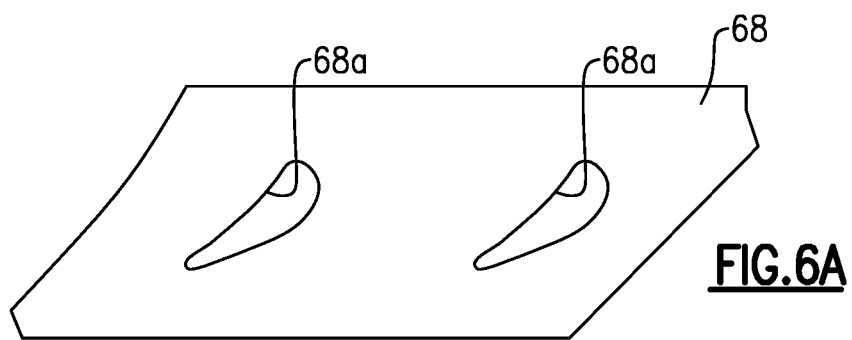
FIG. 6A illustrates a connector fiber ply with uninterrupted airfoil holes.
Figure 6B:
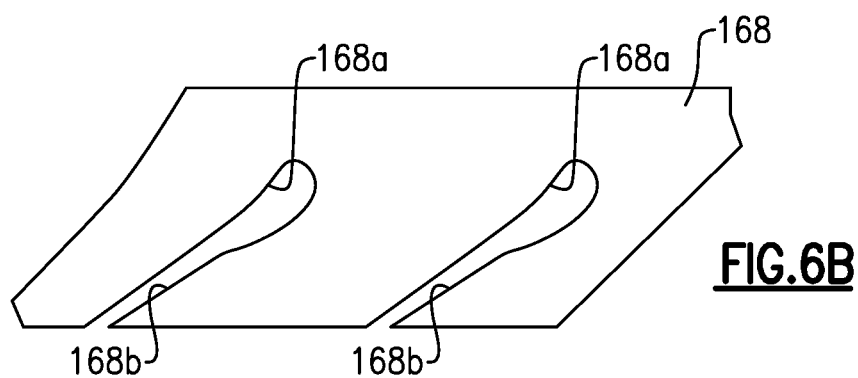
FIG. 6B illustrates a connector fiber ply with airfoil holes and slits.

FIG. 6A illustrates a view of a representative one of the connector fiber plies 68. The connector fiber ply 68 is a continuous ply that defines two or more airfoil holes 68a, which may be formed in the connector fiber ply 68 by cutting out those portions of the ply 68. The airfoil holes 68 are made to be slightly larger in cross-section than the size of the cross-section of the collar 67 that will be received through the airfoil holes 68a. In the illustrated example the airfoil holes 68a are uninterrupted. However, in an alternative example of a connector fiber ply 168 shown in FIG. 6B, the airfoil holes 168a are interrupted by slits 168b that extend to one edge of the ply 168, the function of which will be discussed further below.

Figure 7:
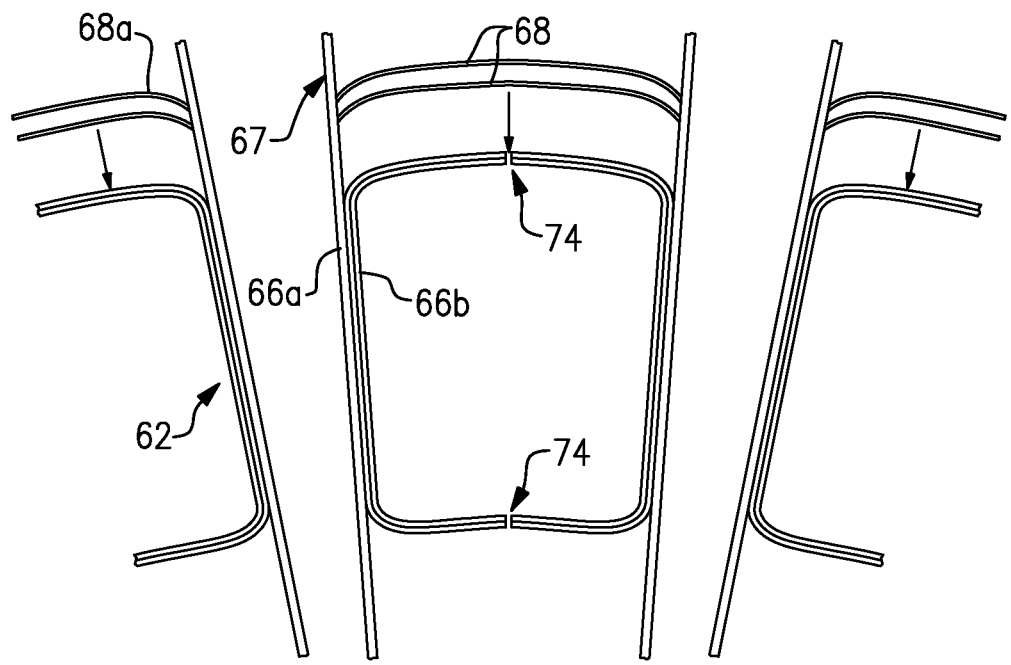
FIG. 7 illustrates connector fiber plies being applied over collars of the airfoil tubes.
Figure 8:
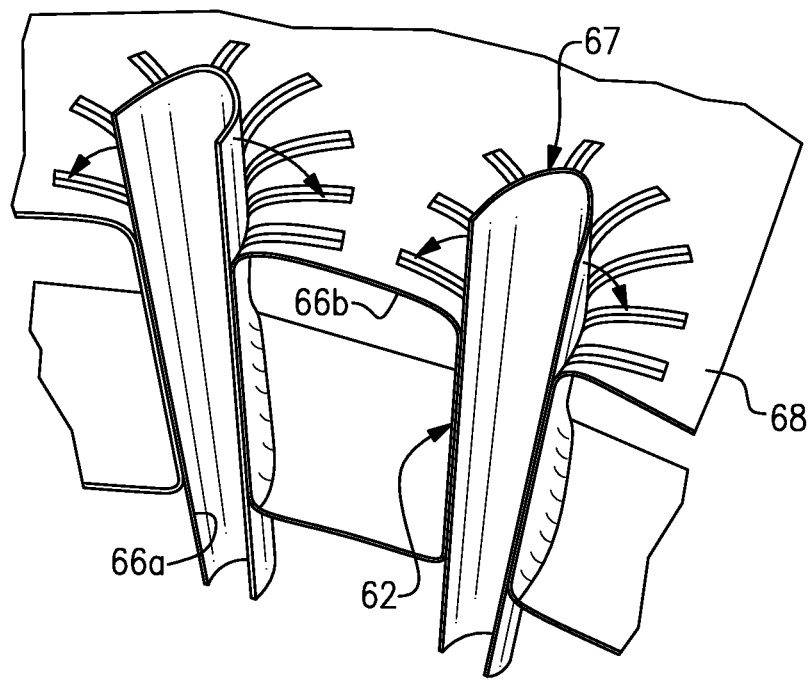
FIG. 8 illustrates the folding down of inner fiber plies of the collars onto a connector fiber ply.

As shown in FIG. 7, the collars 67 formed by the inner fiber plies 66a are then inserted through the airfoil holes 68a of one or more of the connector fiber plies 68 (two in this example). The connector fiber ply 168 with the slits 168b may be used to facilitate insertion. The slit 168b permit the airfoil holes 168a to be temporarily expanded to receive the collars 67 there through. The one or more connector fiber plies 68 bridge over the joint 74 formed by the outer fiber plies 66b and thereby close the joint 74 as a potential leak path. As shown in FIG. 8, one or more of the inner fiber plies 66a of the collar 67 are then folded down onto the connector fiber ply 68 such that the connector fiber ply 68 is sandwiched between the folded inner fiber ply 66a and the outer fiber plies 66b. The inner fiber plies 66a may be unraveled and/or cut to facilitate bending. A binder may be used to help the folded inner fiber plies 66a stay flat on the connector fiber ply 68.

Figure 9:
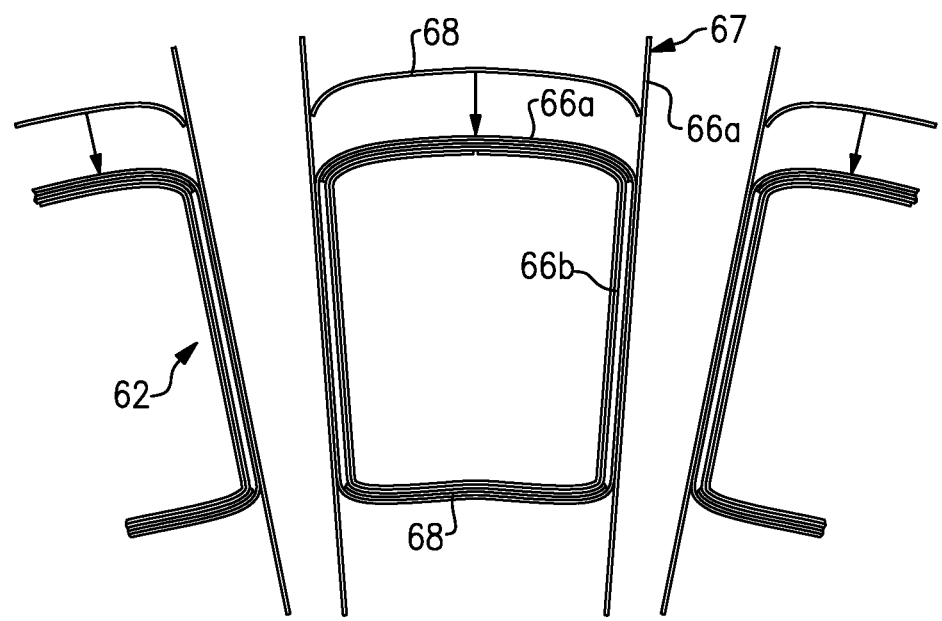
FIG. 9 illustrates another connector fiber ply being applied over the collars.
Figure 10:
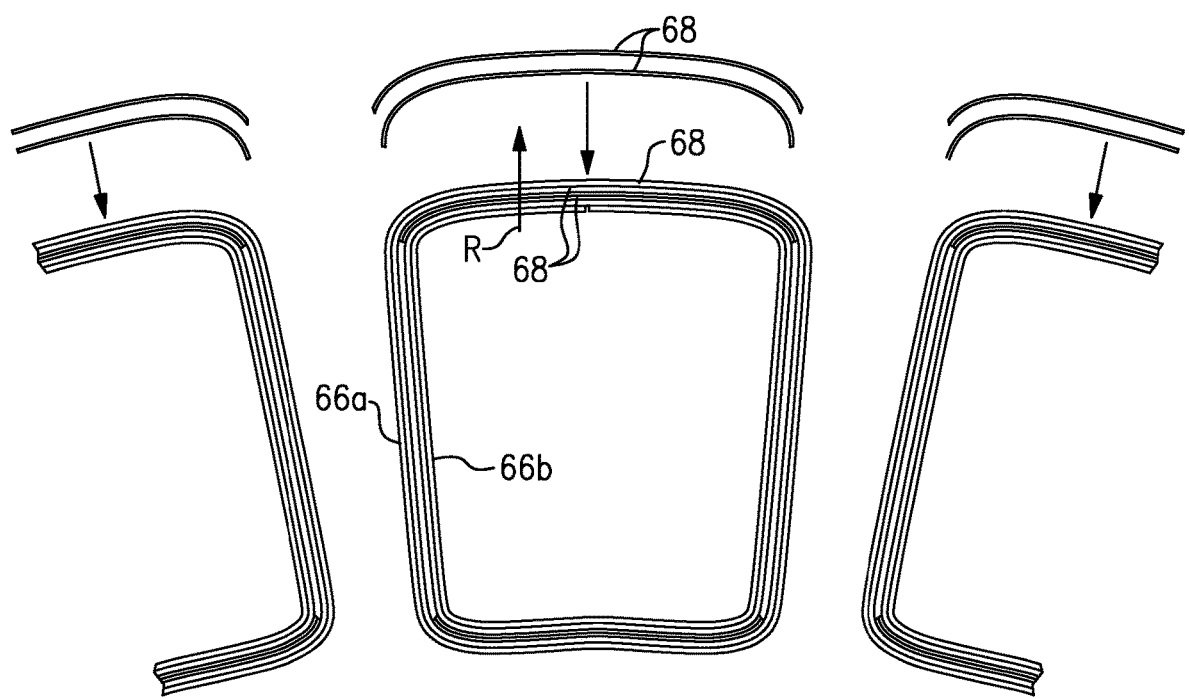
FIG. 10 illustrates additional connector fiber plies be applied after all of the inner fiber plies have been folded down.

As shown in FIG. 9, after one of the inner fiber plies 66a is folded down, an additional connector fiber ply 68 is applied and then the next one of the inner fiber plies 66a in the collar 67 folded down onto the additional connector fiber ply 68. As shown in FIG. 10, once all of the inner fiber plies 66a are folded down, one or more final connector fiber plies 68 are applied thereover to form the final fiber preform. The connector fiber plies 68 are thus interleaved with the fiber plies 66a/66b to secure the airfoil tubes 62 together. As will be appreciated, the numbers of inner fiber plies 66a, outer fiber plies 66b, and connector fiber plies 68 may be varied in order to vary the final wall thickness and strength properties. In the illustrated example, the fiber ply configuration order along radial direction R is 66b/66b/68/68/66a/68/66a/68/68. Subsequent to the lay-up process, the fiber preform is then densified in a known manner. For example, the densification may include, but is not limited to, polymer infiltration and pyrolysis and chemical vapor infiltration.

Figure 11:
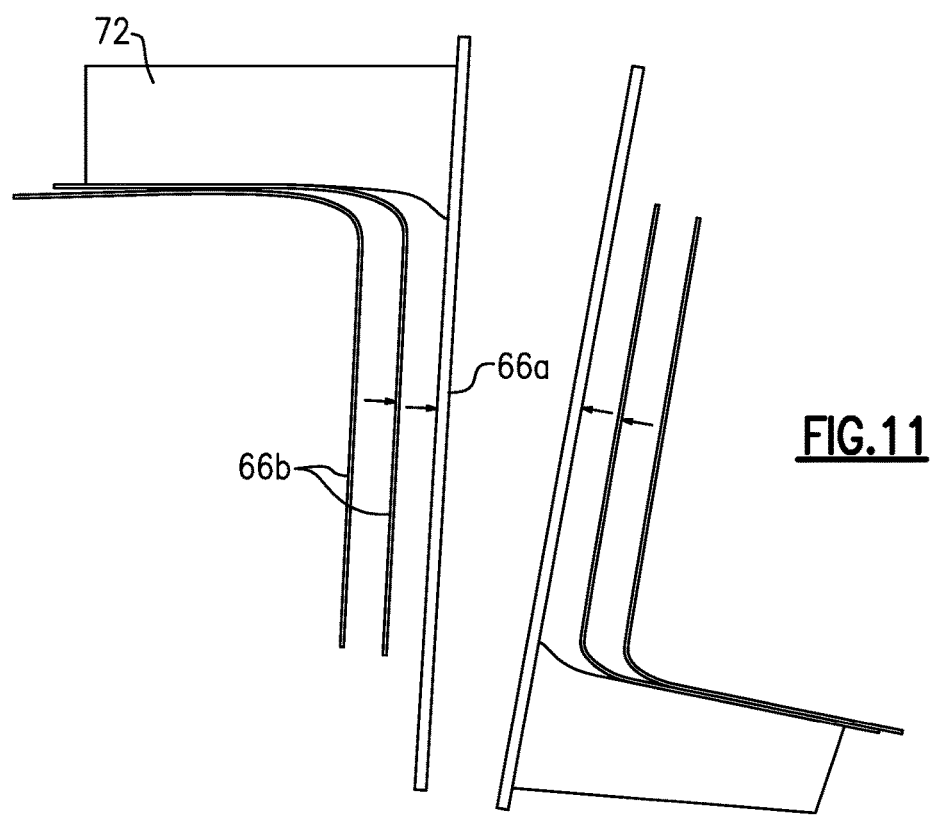
FIG. 11 illustrates another example in which only one end of the outer fiber plies projects outwardly.

FIG. 11 illustrates a modified example in which, instead of both ends of the outer fiber plies 66b being turned to project from the airfoil tube (FIG. 4), only one end is turned to project from the airfoil tube. In the example shown, the opposite ends of the outer fiber plies 66b on each side of the airfoil tube 62 are turned out such that at each radial end of the airfoil tube 62 there is a one-sided platform (i.e., a platform to only one side of the airfoil).

Figure 12:
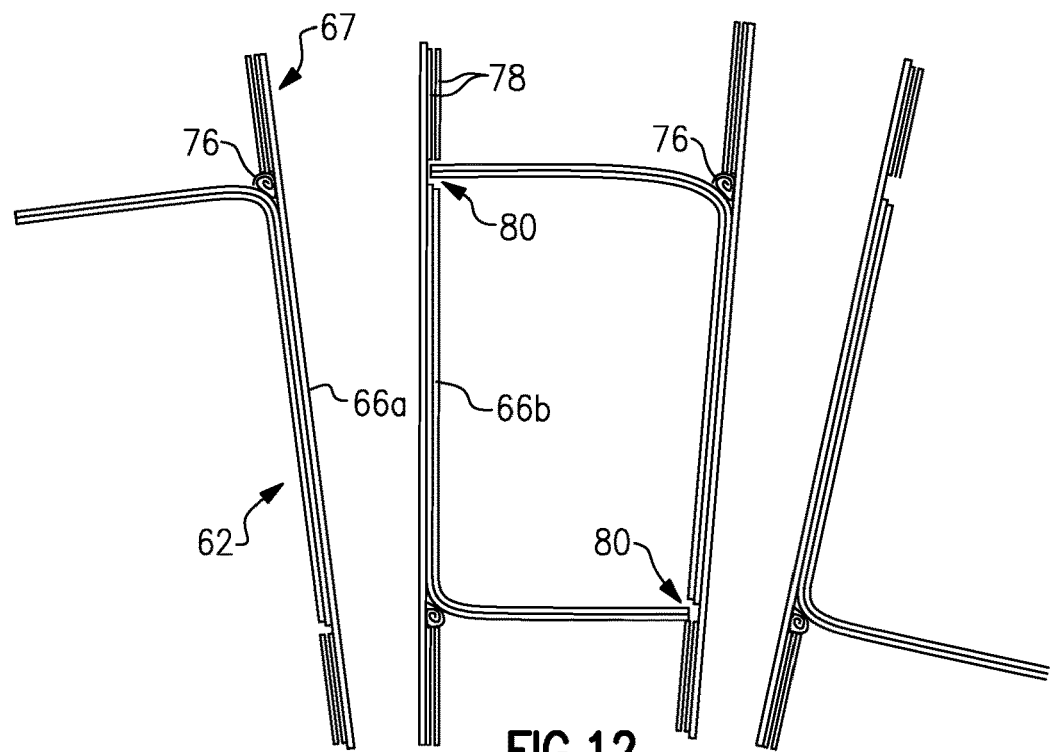
FIG. 12 illustrates a plurality of airfoil tubes abutting each other.

As shown in FIG. 12, the intermediate airfoil tubes are then brought together. However, instead of the edges of the outer fiber plies 66b meeting in joints 74, the edges of the outer fiber plies 66b abut the inner fiber plies 66a of the adjacent airfoil tube 62. Additionally, in this example there are collar fiber plies 78 wrapped around the collar 67 formed by the inner fiber plies 66a. The collar fiber plies 78 together with the outer fiber plies 66b define a pocket 80. The edges the outer fiber plies 66b are received into the pocket 80 of the adjacent airfoil tube 62, to facilitate interconnection of the airfoil tubes 62.

Figure 13:
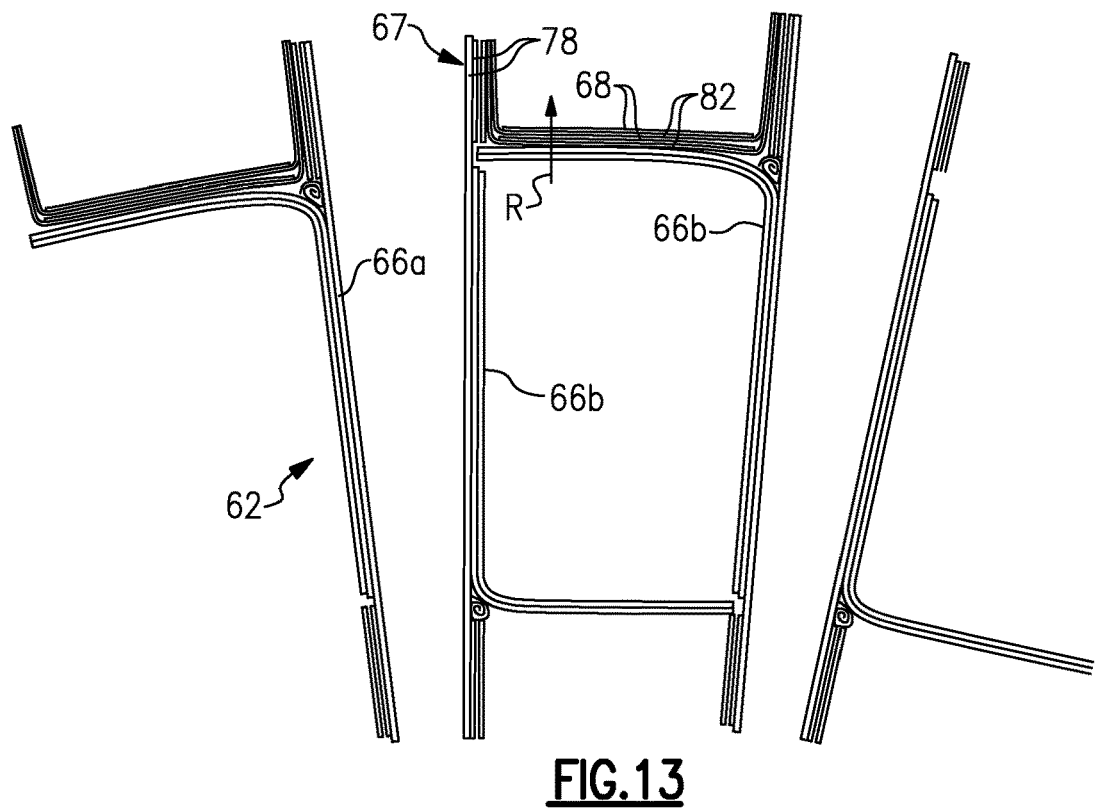
FIG. 13 illustrates connector fiber plies and U-shaped fiber plies being applied.

As shown in FIG. 13, interconnecting U-shaped fiber plies 82 are then applied to bridge adjacent ones of the airfoil tubes 62. The upstanding arms of the U-shaped fiber plies 82 run along the collars 67 of the airfoil tubes 62 and in that regard may be regarded as airfoil tube fiber plies. The collar fiber plies 78 serve to reinforce the collar 67 for lay-up of the U-shaped fiber plies 82. Connector fiber plies 68 are then interleaved with the U-shaped fiber plies 82. In the illustrated example, the fiber ply configuration order along radial direction R is 66b/66b/82/68/82/68. Subsequent to the lay-up process, the fiber preform is then densified in a known manner.

Figure 14:
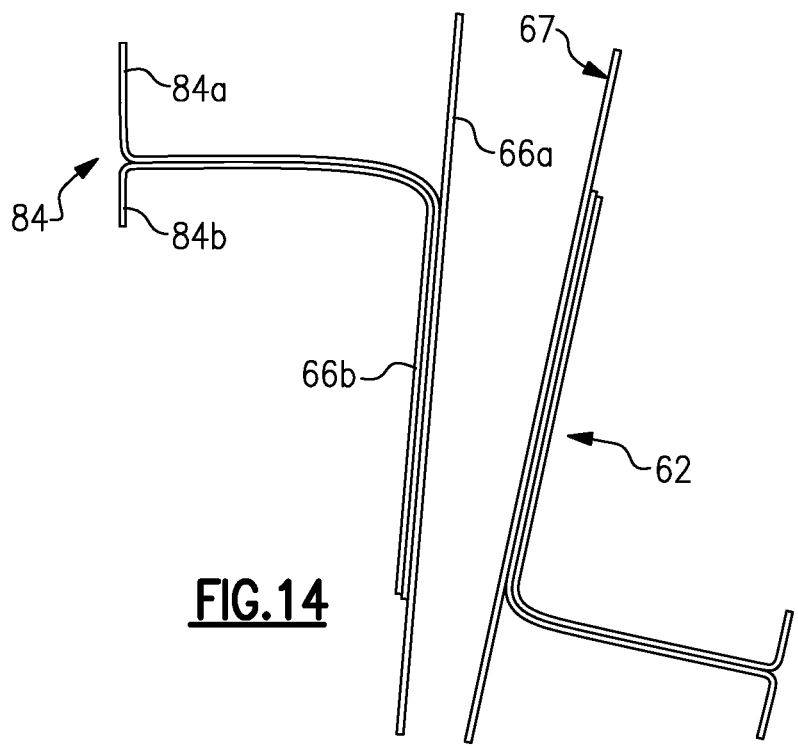
FIG. 14 illustrates another example in which the outer fiber plies have upturned and downturned ends to form a foot.
Figure 15:
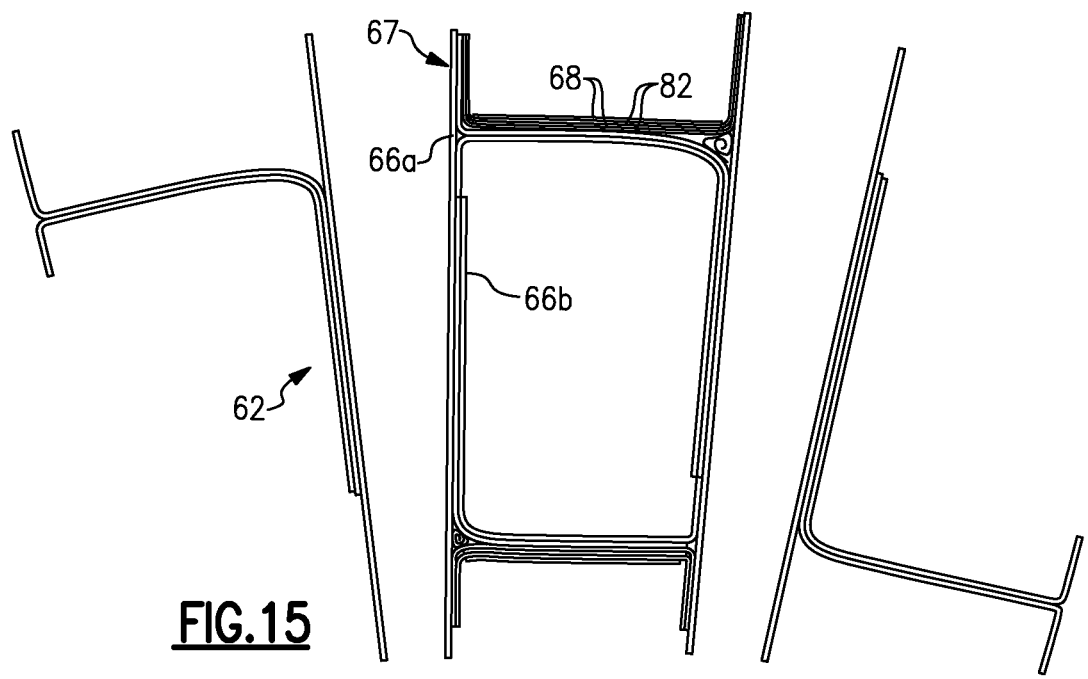
FIG. 15 illustrates connector fiber plies and U-shaped fiber plies being applied.

FIG. 14 shows an example that is similar to that of FIG. 13 except that in this example one of the outer fiber plies 66b has an upturned end 84a and another of the outer fiber plies 66b has a downturned end 84b. The upturned end 84a and the downturned end 84b together form a foot 84 that abuts an adjacent one of the airfoil tubes 62 to facilitate interconnection of the airfoil tubes 62. As shown in FIG. 15, the airfoil tubes 62 in this example do not have the collar fiber plies 78. The connector fiber plies 68 are then interleaved with the U-shaped fiber plies 82 in the same fiber ply configuration order as in the previous example.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil vane multiplet comprising:
   airfoil tubes, each said airfoil tube including airfoil tube fiber plies, a plurality of the airfoil tube fiber plies extending along the airfoil tube and turning to project outwardly from the airfoil tube; and
   connector fiber plies including airfoil holes through which the airfoil tubes extend, the connector fiber plies being interleaved with the plurality of airfoil tube fiber plies such that the airfoil tubes are secured together.

2. The airfoil vane multiplet as recited in claim 1, wherein the plurality of the airfoil tube fiber plies include, relative to an interior of the airfoil tube, inner fiber plies and outer fiber plies, and a portion of the connector fiber plies are sandwiched between the inner fiber plies and the outer fiber plies.

3. The airfoil vane multiplet as recited in claim 2, wherein the inner fiber plies are sandwiched between two of the connector fiber plies.

4. The airfoil vane multiplet as recited in claim 2, wherein the outer fiber plies of one of the airfoil tubes abut the outer fiber plies of another of the airfoil tubes.

5. The airfoil vane multiplet as recited in claim 1, wherein the plurality of the airfoil tube fiber plies includes interconnecting U-shaped fiber plies that bridge adjacent ones of the airfoil tubes and which are interleaved with the connector fiber plies.

6. The airfoil vane multiplet as recited in claim 5, wherein each of the airfoil tubes includes a tube end portion that extends through one of the airfoil holes, and further comprising collar fiber plies wrapped around the tube end portion, the collar fiber plies together with the airfoil tube fiber plies define a pocket, and edges of a portion of the airfoil tube fiber plies of another one of the airfoil tubes are received into the pocket.

7. The airfoil vane multiplet as recited in claim 5, wherein the plurality of the airfoil tube fiber plies include, relative to an interior of the airfoil tube, inner fiber plies and outer fiber plies, one of the outer fiber plies has an upturned end, another of the outer fiber plies has a downturned end, the upturned end and the downturned end forming a foot that abuts an adjacent one of the airfoil tubes.

8. A gas turbine engine comprising:
   a compressor section;
   a combustor in fluid communication with the compressor section; and
   a turbine section in fluid communication with the combustor, the turbine section having airfoil vane multiplets disposed about a central axis of the gas turbine engine, each of the airfoil vane multiplets includes:
   airfoil tubes, each said airfoil tube including airfoil tube fiber plies, a plurality of the airfoil tube fiber plies extending along the airfoil tube and turning to project outwardly from the airfoil tube, and
   connector fiber plies including airfoil holes through which the airfoil tubes extend, the connector fiber plies being interleaved with the plurality of airfoil tube fiber plies such that the airfoil tubes are secured together, the plurality of the airfoil tube fiber plies including, relative to an interior of the airfoil tube, inner fiber plies and outer fiber plies, a portion of the connector fiber plies being sandwiched between the inner fiber plies and the outer fiber plies, the outer fiber plies of one of the airfoil tubes abutting the outer fiber plies of another of the airfoil tubes.

9. A method of fabricating an airfoil vane multiplet comprising:
   providing airfoil tubes that each include airfoil tube fiber plies;
   providing connector fiber plies that include airfoil holes;
   inserting the airfoil tubes through, respectively, the airfoil holes;
   prior to the inserting and after the inserting, turning portions of the airfoil tube fiber plies outwardly to project from the airfoil tube such that the connector fiber plies are interleaved with the airfoil tube fiber plies to secure the airfoil tubes together; and
   prior to the inserting of the airfoil tubes, adjoining the airfoil tubes such that the portions of the airfoil tube fiber plies that are turned outwardly abut each other.

10. The method as recited in claim 9, wherein, after the inserting of the airfoil tubes, the portions of the airfoil tube fiber plies that are turned outwardly are folded onto one of the connector fiber plies, followed by applying additional one of the connector fiber plies on the portions of the airfoil tube fiber plies that are folded.

11. The method as recited in claim 9, wherein the airfoil tube fiber plies include interconnecting U-shaped fiber plies that bridge adjacent ones of the airfoil tubes and which are interleaved with the connector fiber plies.

12. The method as recited in claim 11, wherein each of the airfoil tubes includes a tube end portion, and further comprising collar fiber plies wrapped around the tube end portion, the collar fiber plies together with the airfoil tube fiber plies define a pocket, and edges of a portion of the airfoil tube fiber plies of another one of the airfoil tubes are received into the pocket.

13. The method as recited in claim 11, wherein the airfoil tube fiber plies include, relative to an interior of the airfoil tube, inner fiber plies and outer fiber plies, and including upturning one of the outer fiber plies to form an upturned end, and downturning another of the outer fiber plies to form a downturned end, the upturned end and the downturned end forming a foot that abuts an adjacent one of the airfoil tubes.

* * * * *